(12) United States Patent
Cha

(10) Patent No.: US 8,275,588 B2
(45) Date of Patent: Sep. 25, 2012

(54) EMULATION SYSTEM AND DRIVING METHOD THEREOF

(75) Inventor: Chi-Ho Cha, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 551 days.

(21) Appl. No.: 12/425,886

(22) Filed: Apr. 17, 2009

(65) Prior Publication Data

US 2009/0271174 A1 Oct. 29, 2009

(30) Foreign Application Priority Data

Apr. 23, 2008 (KR) .................. 10-2008-0037747

(51) Int. Cl.
*G06G 7/56* (2006.01)

(52) U.S. Cl. .............. 703/5; 703/13; 703/14; 703/15; 703/16; 703/17; 714/29; 716/116; 716/102

(58) Field of Classification Search ............ 703/28, 703/13–25; 716/116, 102; 714/29
See application file for complete search history.

(56) References Cited

U.S. PATENT DOCUMENTS

| | | | | |
|---|---|---|---|---|
| 5,748,875 A | * | 5/1998 | Tzori | 714/29 |
| 6,377,912 B1 | * | 4/2002 | Sample et al. | 703/28 |
| 7,114,110 B2 | | 9/2006 | Kikuchi et al. | |
| 7,924,845 B2 | * | 4/2011 | Diehl et al. | 370/395.4 |
| 2002/0161568 A1 | * | 10/2002 | Sample et al. | 703/25 |
| 2002/0162084 A1 | * | 10/2002 | Butts et al. | 716/17 |
| 2002/0177990 A1 | * | 11/2002 | Sample | 703/28 |
| 2003/0074178 A1 | * | 4/2003 | Sample et al. | 703/25 |
| 2003/0154458 A1 | * | 8/2003 | Butts et al. | 716/17 |
| 2005/0068949 A1 | * | 3/2005 | Diehl et al. | 370/389 |

FOREIGN PATENT DOCUMENTS

| | | |
|---|---|---|
| JP | 2001-337136 | 12/2001 |
| JP | 2003-307545 | 10/2003 |
| KR | 1020030082410 | 10/2003 |
| KR | 1020060021429 | 3/2006 |

* cited by examiner

*Primary Examiner* — Kamini S Shah
*Assistant Examiner* — Cuong Luu
(74) *Attorney, Agent, or Firm* — F. Chau & Associates, LLC

(57) ABSTRACT

An emulation system includes a first circuit for emulating a first logical part of a device, a second circuit for emulating a second logical part of the device that is different from the first logical part, wherein the first circuit is separate from the second circuit, and a third circuit connecting the first circuit and the second circuit to communicate signals between the first circuit and the second circuit.

20 Claims, 16 Drawing Sheets

EMULATION SYSTEM AND DRIVING METHOD THEREOF

CROSS-REFERENCE TO RELATED APPLICATIONS

This application claims priority to Korean Patent Application No. 10-2008-0037747, filed on Apr. 23, 2008, the disclosure of which is incorporated by reference herein.

BACKGROUND

1. Technical Field

Embodiments of the present invention relate to emulation systems, and more particularly to an emulation system and a driving method to shorten a data transmission time between an external computer and an emulation board.

2. Discussion of Related Art

Emulation systems are used to verify intellectual properties (IPs) or products including IPs (e.g., a device-under-test (DUT)). A DUT can be verified in less time using an emulation system as compared to using a simulation.

Field programmable gate arrays (FPGAs) may also be utilized when emulating products including IPs. Xilinx™ LX330 is an FPGA that is equipped with about 2,500,000 gates and 900 primary input/output pins. A DUT including an IP formed of tens of millions of gates may be emulated by several FPGAs.

For example, assume that a DUT is emulated by means of two LX330 FPGAs. The internal signal lines between the two FPGAs are connected through external input/output pins of the FPGAs. If the number of internal signal lines between the two FPGAs is 9,000, 9,000 signal lines may be interconnected to each other using time division multiplexing at a ratio of 10 multiplexers for every 1 demultiplexer. Due to the inordinate amount of signal lines, it may take a long time to emulate the DUT and transfer results of the emulation to an external computer.

Thus, there is a need for emulation systems that can transmit data to an external computer in less time and methods of driving such emulating systems.

SUMMARY OF THE INVENTION

An exemplary embodiment of the present invention includes an emulation system including: a first circuit for emulating a first logical part of a device, a second circuit for emulating a second logical part of the device that is different from the first logical part, and a third circuit connecting the first circuit and the second circuit to communicate signals between the first circuit and the second circuit. The first circuit is separate from second circuit. The emulation system may be configured to verify an intellectual property of the device.

The emulation system may be connected to a computer through a bus. The bus may include one of small computer system interface (SCSI), peripheral component interconnection (PCI), peripheral component interconnection express (PCI-E), serial advanced technology attachment (S-ATA), parallel advanced technology attachment (P-ATA), or a universal serial bus (USB).

The third circuit may be a time division connector. Each of the first and second circuits may include a flipflop and a state value of the flipflop of the first circuit may be transferred to the flipflop of the second circuit through the time division connector while resultant data of the first through third circuits is sent to an external source (e.g., a computer).

The emulation system may include a controller for controlling a normal clock for output to the first and second circuits and controlling a shift clock and a selection signal for output to the third circuit. The third circuit may be a time division connector that connects the first circuit to the second circuit in a time division manner and operates in sync with the shift clock.

The computer may transfer input data to the first and second circuits, for verifying the first and second circuits, and receive output data of the first and second circuits from an emulation board of the emulation system.

The time division connector may includes a plurality of multiplexers receiving signals from output pins of the first and second circuits in response to the selection signal of the controller, and a plurality of demultiplexers transferring signals from the plurality of multiplexers to input pins of the first and second circuits in response to the selection signal of the controller.

Flipflops of the first and second circuits may be synchronized to a normal clock and flipflops of the time division connector may be synchronized to a shift clock. The first and second circuits may be formed of field programmable gate arrays.

An exemplary embodiment of the present invention includes a method of driving an emulation system with an emulation board including: separate first and second emulators configured to respectively emulate first and second logical parts of a device. The method may be used to verify an intellectual property of the device. The emulation board may be connected to a computer through a bus. The driving method includes transferring input data to the emulation board, applying input data to inputs of the first and second circuits through the emulation board, operating the first and second chips for one normal clock cycle, operating a time division connector connecting the first circuit and the second circuit for one shift clock cycle, transferring output data of the first and second circuits to the emulation board, and setting state values of flipflops of the first and second circuits and transferring the output data to the computer.

An exemplary embodiment of the present invention includes a method of driving an emulation system with an emulation board including: separate first and second emulators configured to respectively emulate first and second logical parts of a device. The method includes transferring verification data to the first and second circuits, operating the first and second circuits for a cycle of a clock, and transferring a state value of the first circuit to the second circuit while sending output data of the first and second circuits to an external source.

BRIEF DESCRIPTION OF THE FIGURES

Embodiments of the present invention will be described with reference to the following figures, wherein like reference numerals refer to like parts throughout the various figures unless otherwise specified. In the figures.

DETAILED DESCRIPTION OF EXEMPLARY EMBODIMENTS

Embodiments of the present invention may be embodied in various forms and should not be construed as limited to the embodiments set forth herein. Hereinafter, exemplary embodiments of the present invention will be described in conjunction with the accompanying drawings.

Figure 1:
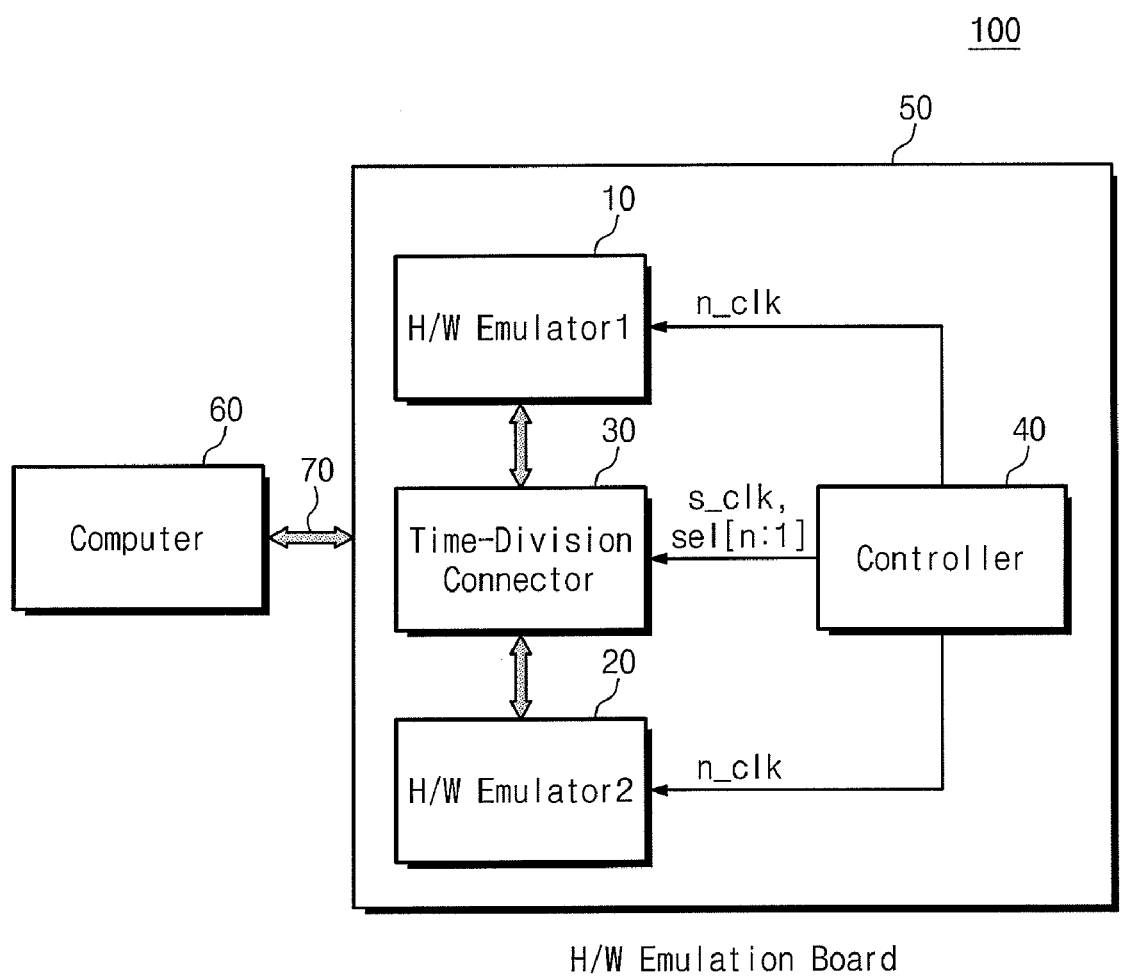
FIG. 1 is a block diagram of a hardware emulation system according to an exemplary embodiment of the present invention.

FIG. 1 is a block diagram of a hardware emulation system according to an exemplary embodiment of the present invention. Referring to FIG. 1, the hardware emulation system 100 is comprised of a hardware emulation board 50 for verifying a DUT, and a computer 60 connected to the hardware emulation board 50 through a bus 70.

In at least one embodiment of the present invention the bus 70 is a peripheral component interconnection (PCI). However, the computer 60 may be connected with the hardware emulation board 50 through other means such as serial advanced technology attachment (S-ATA), parallel advanced technology attachment (P-ATA), small computer system interface (SCSI), or universal serial bus (USB) (e.g., USB 2.0). The hardware emulation board 50 includes first and second hardware emulators 10 and 20, a time-division connector 30, and a controller 40.

An IP having millions of gates or a DUT including such an IP may be verified by means of hardware emulation by dividing the IP or DUT into unit logic blocks having verifiable gates counts. Hardware emulation may operate by employing an FPGA. When a Xilinx™ LX330 is used, an IP or DUT may need to be divided into separate blocks under 2,500,000 gates to be verified.

A DUT to be verified may be divided into first and second logic blocks, which have gate counts similar to each other. The DUT may be divided by commercial tools. The first hardware emulator 10 emulates the first logic block and the second hardware emulator 20 emulates the second logic block. By dividing a DUT with a gate count of millions into the first and second logic blocks, thousands of signal lines may be generated between the first and second logic blocks.

In one embodiment of the present invention, it is assumed that each of the first and second hardware emulators 10 and 20 is an LX330, which includes 2,500,000 gates and 900 external input/output pins. A time-division connection method may be employed for linking 10,000 internal lines of the emulators 10 and 20 with each other by way of the 900 input/output pins.

The time-division connection method may be carried out by sequentially exchanging up to 10,000 internal signals between the first hardware emulator 10 and the second hardware emulator 20 using multiplexers and demultiplexers of a time-division connector 30 in response to a shift clock s_clk (e.g., during a shift operation).

The time-division connector 30 operates in a time-division mode. The time-division connection method will be discussed with reference to FIG. 5. A controller 40 controls the first and second hardware emulators 10 and 20 using a normal clock n_clk. The controller 40 operates the time-division connector 30 using a shift clock s_clk and a selection signal sel[n:1]. The shift clock s_clk may be a shifted version of the normal clock n_clk. For example, the shift clock s_clk may be out of phase with the normal clock n_clk by a certain angle.

The computer 60 is connected to the hardware emulation board 50 through the bus 70 (e.g., a PCI bus). The first and second hardware emulators 10 and 20 are mounted on the hardware emulation board 50. The computer 60 may apply verification data through the bus 70 to verify the first and second hardware emulators 10 and 20 and accept a result of processing the verification data therefrom.

A single DUT may be divided into first and second logical parts for respective emulation by the first and second hardware emulators 10 and 20. Paths connected between from primary inputs PI and primary outputs PO of the first and second logical parts can be sorted into feed-through paths and non-feed-through paths. A feed-through path is a path from a primary input PI to a primary output PO that does not include latching (or storing) by a storage device, such as a flipflop. A feed-through path will be discussed later in conjunction with FIG. 4. A non-feed-through path is a path from a primary input PI to primary output PO without a feeding-through. The non-feed-through path includes storage by a storage device (e.g., a flipflop) on the way from the primary input PI to the primary output PO.

A DUT may be divided into first and second parts for respective emulation by the first and second hardware emulators 10 and 20 by granting priority to an area (e.g., a number of gates) of the DUT. Thus, the aforementioned feed-through path may be present in the first hardware emulator 10, the second hardware emulator 20, or the first and second hardware emulators 10 and 20.

Figure 4:
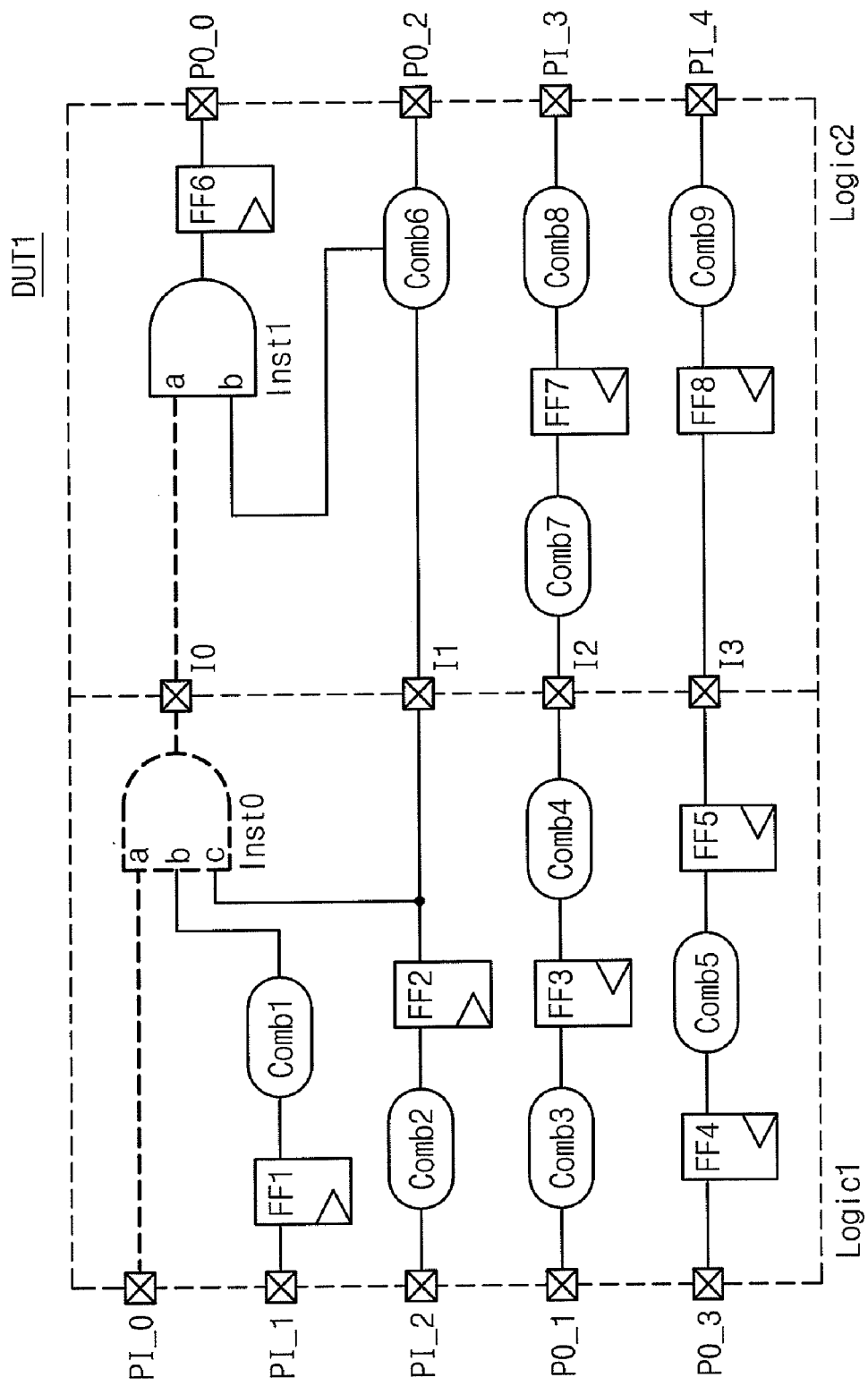
FIG. 4 is a block diagram showing a first device divided into first and second logic blocks.
Figure 5:
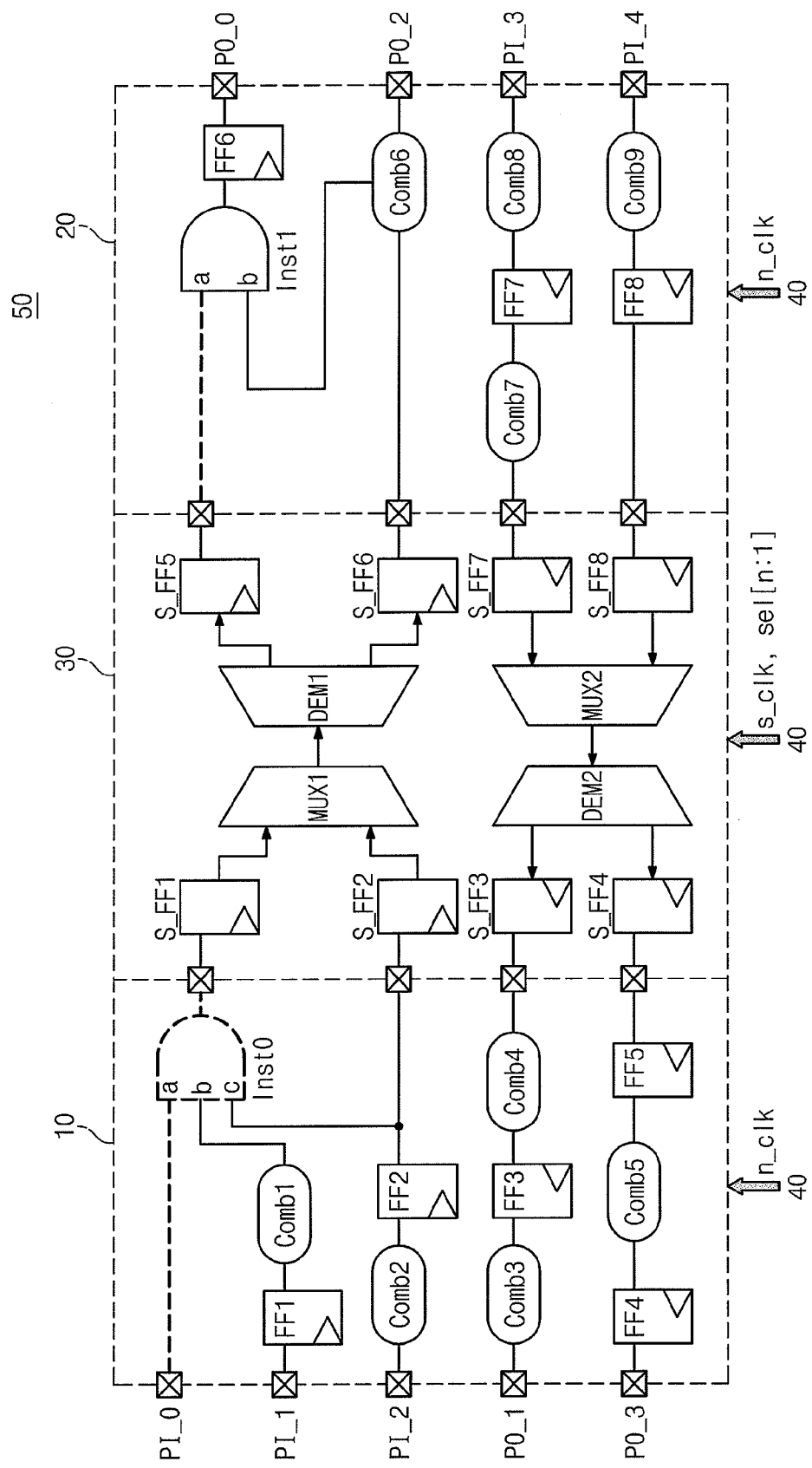
FIG. 5 is a block diagram illustrating first and second emulators respectively emulating the first and second logic blocks of FIG. 4, according to an exemplary embodiment of the present invention.

Embodiments of feed-through paths present in the first hardware emulator 10 are shown in FIGS. 4 and 5. The feed-through paths extend from the primary inputs PI of the first hardware emulator 10 to the time-division connector 30.

If the feed-through paths are in the first hardware emulator 10 from the primary inputs PI to the time-division connector 30, verification data received by the primary inputs PI may be transferred to the second hardware emulator 20 through the time-division connector 30 before activation of the normal clock n_clk of the first hardware emulator 10.

An operation of transferring verification data received by the primary inputs PI to the second hardware emulator 20 through the time-division connector 30 before activation of the normal clock n_clk of the first hardware emulator 10, is referred to as a 'shifting for backend data transfer (BDT)'. Conducting or skipping the shifting for BDT will be discussed with reference to FIGS. 5 and 6.

An unlatched path is present from the primary inputs PI of the first hardware emulator 10 to the primary outputs PO of the second hardware emulator 20 through the time-division connector 30. In an unlatched path, verification data may be transferred to the second hardware emulator 20 through the time-division connector 30 before activation of the normal clock n_clk of the first hardware emulator 10. An unlatched path will be discussed with reference to FIGS. 7 and 8.

An operation that verification data provided into the primary inputs PI of the first hardware emulator 10 is transferred to the second hardware emulator 20 through the non-division connector 30 before activation of the normal clock n_clk of the first hardware emulator 20 is referred to as a 'shifting for frontend data transfer (FDT)'. Conducting or skipping the shifting for FDT will be discussed with reference to FIGS. 12 and 13.

Figure 2:
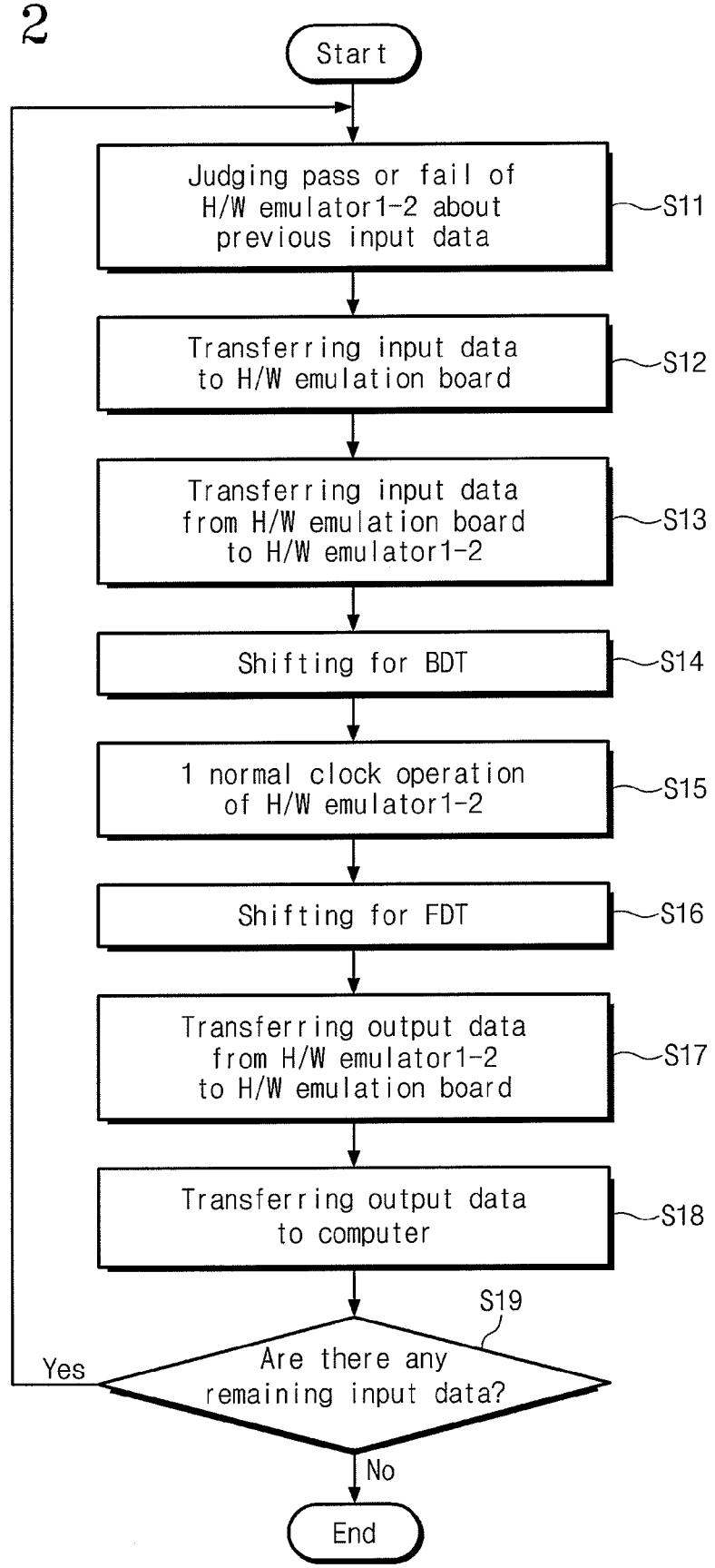
FIG. 2 is a flow chart showing an emulation method including a feed-through path, according to an exemplary embodiment of the present invention.

FIG. 2 is a flow chart showing an emulation method according to an exemplary embodiment of the present invention, which may be used when a feed-through path is present. Referring to FIGS. 1 and 2, the computer 60 prepares new input data for verifying the first and second hardware emulators 10 and 20. The computer 60 determines pass/fail states of the first and second hardware emulators 10 and 20 by comparing an expected output of the emulators against an actual output of the emulators. For example, the computer compares output data of the emulators with previous input data for verifying the first and second hardware emulators 10 and 20 (S11).

Thereafter, the computer 60 transfers new input data to the hardware emulation board 50 for verifying the first and second hardware emulators 10 and 20 (S12). Then, the first and second hardware emulators 10 and 20 receive the new input data from the hardware emulation board 50 (S13). The first and second hardware emulators 10 and 20 execute shifting for BDT in sync with the shift clock s_clk (S14). The first and second hardware emulators 10 and 20 conduct a normal operation in one clock cycle in sync with the normal clock n_clk (S15). The first and second hardware emulators 10 and 20 conduct the shifting for FDT in sync with the shift clock s_clk (S16). The first and second emulators 10 and 20 transfers output data to the hardware emulation board 50 (S17). Then, the hardware emulation board 50 transfers the output data to the computer 60 (S18).

The computer 60 determines whether there is other input data to be used for verifying the first and second hardware emulators 10 and 20. If there is new input data, then step S11 is resumed. Unless there is new input data, the emulation procedure for the hardware emulation system 100 is terminated (S19).

Figure 3:
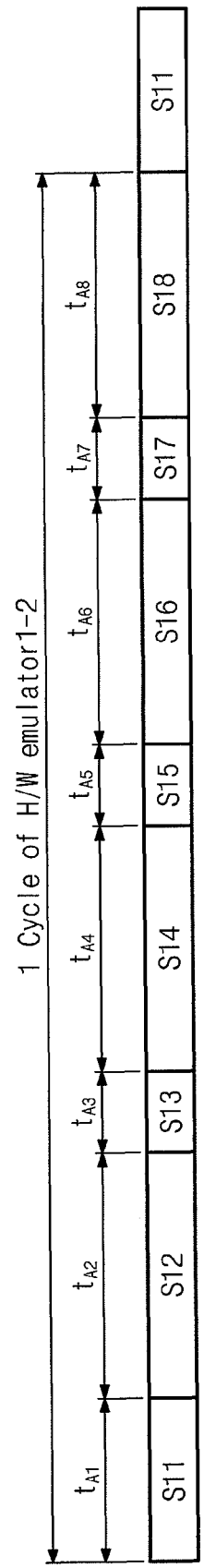
FIG. 3 illustrates durations of steps of the emulation method shown in FIG. 2.

FIG. 3 illustrates durations of steps of the emulation method shown in FIG. 2. Referring to FIGS. 2 and 3, the operating steps (S11 to S18) are correspondent to one clock cycle of the first and second hardware emulators 10 and 20. The step S11 corresponds to a time $t_{41}$. The step S12 corresponds to a time $t_{42}$. The step S13 corresponds to a time $t_{43}$. The step S14 corresponds to a time $t_{44}$. The step S15 corresponds to a time $t_{45}$. The step S16 corresponds to a time $t_{46}$. The step S17 corresponds to a time $t_{47}$. The step S18 corresponds to a time $t_{48}$. As a result, one clock cycle of the first and second hardware emulators 10 and 20 is a sum of the times from $t_{41}$ to $t_{48}$. Thus, one clock cycle of the emulation system conducting the shifting operations for BDT and FDT is a sum of the times from $t_{41}$ to $t_{48}$.

FIG. 4 is a block diagram showing a dividing of a first device DUT1 into first and second logic blocks. Referring to FIG. 4, the first device DUT1 is divided into the first and second logic blocks Logic1 and Logic2 (e.g., by means of a commercial tool). A BDT path is generated when the first device DUT1 is divided into the first and second logic blocks Logic1 and Logic2. In the first logic block Logic1, the BDT path is connected from the primary input PI_0 to a port 10 that is an interface between the first and second logic blocks Logic1 and Logic2, without passing through a storage device such as a flipflop. The BDT path includes passage through an input node a of an AND gate Inst0 and an output node of the AND gate Inst0. The BDT path is illustrated by a thick broken line in FIG. 4.

With the BDT path, if the hardware emulators are formed by dividing the first device DUT1 into the two logic blocks Logic1 and Logic2, signals on their boundary are transferred during a shifting operation, but not during a normal clock operation. If a hardware emulator according to an exemplary embodiment of the present invention includes the BDT path, the shifting operation may be skipped, as will be discussed in conjunction with FIG. 6.

In the second logic block Logic2, the input node a of the AND gate Inst1 is connected to the primary input PI_0 and an input node b of the AND gate Inst1 is connected to an output of a sixth combination circuit Comb6 of the second logic block Logic2. If the first and second logic blocks Logic1 and Logic2 are respectively emulated by the hardware emulators, the boundary between the first and second logic blocks Logic 1 and Logic2 is connected to external input/output (IO) pins of the hardware emulators. In a normal operation, signals are transferred into the first and second logic blocks Logic1 and Logic2. Signals from the boundary between the first and second logic blocks Logic1 and Logic2 are transferred thereinto during the shifting operation. Thus, an output of the AND gate Inst0 is transferred to an input node a of an AND gate Inst1 during the shifting operation, and an output of the sixth combination circuit Comb6 is transferred to the input node b of the AND gate Inst1 during the normal operation.

FIG. 5 is a block diagram illustrating first and second emulations 10 and 20 emulating the first and second logic blocks, according to an exemplary embodiment of the present invention. Referring to FIGS. 4 and 5, the first logic block Logic1 is emulated by the first hardware emulator 10 while the second logic block Logic2 is emulated by the second hardware emulator 20. The first and second emulators 10 and 20 according to an exemplary embodiment of the present invention are made of FPGAs.

The first hardware emulator Logic1 includes a plurality of the primary inputs PI_0, PI_1, and PI_2, and a plurality of the primary outputs PO_1 and PO_3, first through fifth combination circuits Comb1~Comb5, the AND gate Inst0, and first through fifth flipflops FF1~FF5. The second hardware emulator Logic2 includes a plurality of the primary inputs PI_3 and PI_4, a plurality of the primary outputs PO_0 and PO_2, sixth through ninth combination circuits Comb6~Comb9, the AND gate Inst1, and sixth through eighth flipflops FF6~FF8.

The first through fifth flipflops FF1~FF5 of the first hardware emulator 10 operate in sync with the normal clock n_clk of the controller 40. The sixth through ninth flipflops FF6~FF9 of the second hardware emulator 20 operate in sync with the normal clock n_clk of the controller 40.

The first and second hardware emulators 10 and 20 are connected to each other by the time-division connector 30. The time-division connector 30 includes first through eighth shift flipflops S_FF1~S_FF8, first and second multiplexers MUX1 and MUX2, and first and second demultiplexers DEM1 and DEM2.

The first and second shift flipflops S_FF1 and S_FF2 operate as buffers for outputs of the first hardware emulator 10. The third and fourth shift flipflops S_FF3 and S_FF4 operate as buffers for inputs to the first hardware emulator 10. The sixth and eighth shift flipflops S_FF7 and S_FF8 operate as buffers for outputs of the second hardware emulator 20. The fifth and sixth shift flipflops S_FF5 and S_FF6 operate as buffers for inputs to the second hardware emulator 20. The first through eighth shift flipflops S_FF1~S_FF8 operate in sync with the shift clock s_clk.

The output of the AND gate Inst0 is input to the first shift flipflop S_FF1 and an output of the second flipflop FF2 is input to the second shift flipflop S_FF2. An output of the fourth combination circuit Comb4 is input to the third shift flipflop S_FF3 and an output of the fifth flipflop FF5 is input to the fourth shift flipflop S_FF4.

An output of the fifth shift flipflop S_FF5 is applied to the input node a of the AND gate Inst1 and an output of the sixth shift flipflop S_FF6 is input to the sixth combination circuit Comb6. An output of the seventh shift flipflop S_FF7 is input to the seventh combination circuit Comb7 and an output of the eighth shift flipflop S_FF8 is input to the eight combination circuit Comb8.

The first and second shift flipflops S_FF1 and S_FF2, the first and second multiplexers MUX1 and MUX2, and the first and second demultiplexers DEM1 and DEM2 of the time-division connector 30, operate in response to the selection signal sel[n:1]. Outputs of the first and second shift flipflop S_FF1 and S_FF2 are transferred to inputs of the fifth and sixth flipflops S_FF5 and S_FF6 in response to the selection signal sel[n:1]. Outputs of the seventh and eighth shift flipflop S_FF7 and S_FF8 are transferred to inputs of the third and fourth flipflops S_FF3 and S_FF4 in response to the selection signal sel[n:1].

Figure 6:
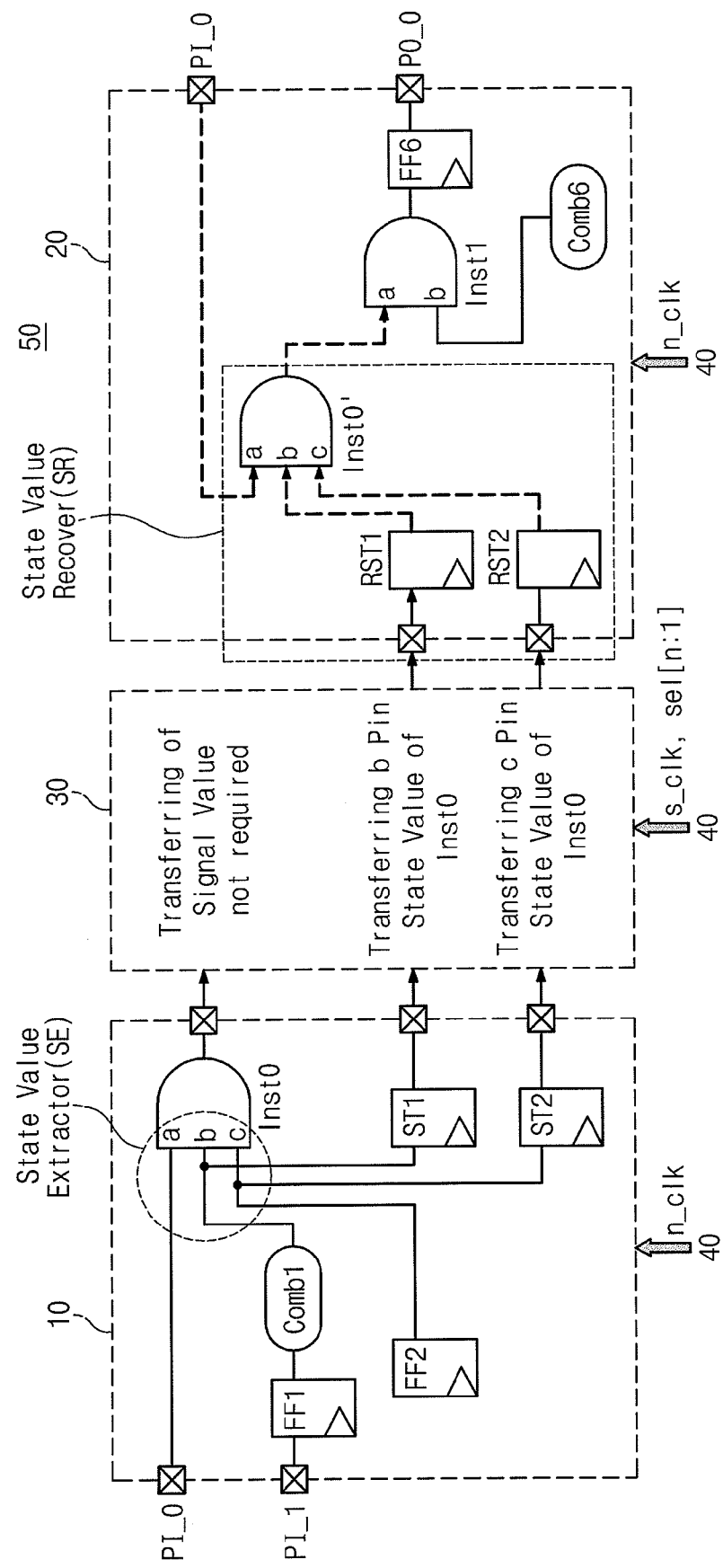
FIG. 6 is a circuit diagram that illustrates modifications that may be made to the emulators of FIG. 5 to skip a shifting operation time.

FIG. 6 is a circuit diagram that may be used to skip a shifting operation time when a hardware emulator includes the BDT path shown in FIG. 5. Referring to FIGS. 4 through 6, the BDT path is generated by dividing the first device DUT1 of FIG. 4 into two logic parts for respective emulation by the first and second emulators 10 and 20 shown in FIG. 5. In the first hardware emulator 10, the BDT path is connected from the primary input PI_0 to the port that is an interface between the first and second logic blocks Logic1 and Logic2, without passing through a flipflop. The BDT path passes through the input node a of the AND gate Inst0 and the output node of the AND gate Inst0. The BDT path is illustrated by a thick broken line in FIG. 5.

In the second logic block Logic2, the input node a of the AND gate Inst1 is connected to the primary input PI_0 and an input node b of the AND gate Inst1 is connected to the output of the sixth combination circuit Comb6.

If the first hardware emulator 10 according to an exemplary embodiment of the present invention includes the BDT path, the second hardware emulator 20 is functionally equipped with a combination circuit for making the BDT path, and a plurality of flipflops for storing state values to all inputs of the combination circuit.

Status values of the plurality of flipflops are equivalently provided to the second hardware emulator 20 in function transfers state values for all inputs of the combination circuit forming the BDT path of the first hardware emulator 10 while operation results of the first and second hardware emulators 10 and 20 about previous data are sent.

The first hardware emulator 10 includes the BDT path illustrated by the thick broken line. The BDT path passes through the primary input PI_0, the input node a of the AND gate Inst0, and the output of the AND gate Inst0.

Current data is transferred to the AND gate Inst1 of the second hardware emulator 20 by way of the primary input PI_0 of the first hardware emulator 10 and the AND gate Inst0. This current data may be transferred to the input node a of the AND gate Inst1 before activation of the normal clock n_clk of the first and second hardware emulators 10 and 20.

The shifting operation, which is synchronized to the shift clock s_clk of the time division connector 30, may precede the normal clock n_clk of the first and second hardware emulators 10 and 20.

A first state flipflop ST1 stores a previous state value of the input node b of the AND gate Inst0 of the first hardware emulator 10. A second state flipflop ST2 stores a previous state value of the input node c of the AND gate Inst0 of the first hardware emulator 10.

The first hardware emulator 10 may be additionally comprised of the first and second state flipflops ST1 and ST2 for storing state values of all inputs of the combination circuit (e.g., the AND gate Inst0) forming the BDT path. The first and second state flipflops ST1 and ST2 store state values of the inputs of the AND gate Inst0 according to the previous normal clock n_clk. The state values stored in the first and second state flipflops ST1 and ST2 are transferred to first and second state recovery flipflops RST1 and RST2 while resultant data of the first and second hardware emulators 10 and 20 is sent to the computer 60 after completing activation of the previous normal clock n_clk.

The first state recovery flipflop RST1 receives a previous state value of an input node b of an AND gate Inst0' of the first hardware emulator 10 from the first state flipflop ST1 and restores the previous state value. The second state recovery flipflop RST2 receives a previous state value of an input node c of the AND gate Inst0' of the first hardware emulator 10 from the second state flipflop ST2 and restores the previous state value.

The second hardware emulator 20 may be further comprised of the primary input PI_0, the AND gate Inst0', and the first and second state recovery flipflops RST1 and RST2 for restoring the state values of the input nodes b and c of the AND gate Inst0', which form the BDT path of the first hardware emulator 10.

Before activation of the current normal clock n_clk, the input nodes b and c of the AND gate Inst0' are set to the state values restored by the first and second state recovery flipflops RST1 and RST2. An input node a of the AND gate Inst0' may be directly connected to the primary input PI_0.

The first and second state flipflops ST1 and ST2 store the state values of the input nodes b and c of the AND gate Inst0 according to the previous normal clock n_clk. Thus, the state values stored in the first and second state flipflops ST1 and ST2 are transferred to the first and second state recovery flipflops RST1 and RST2 while resultant data of the first and second hardware emulators 10 and 20 is sent to the computer 60 after completing the previous normal clock n_clk. For example, the first hardware emulator 10 transfers an abstracted state value through a state value abstractor and the second hardware emulator 20 restores the abstracted state value through a state value restorer.

Consequently, embodiments of the hardware emulation system 100 may provide equality of data transmission speed whether or not a BDT path is present.

Figure 7:
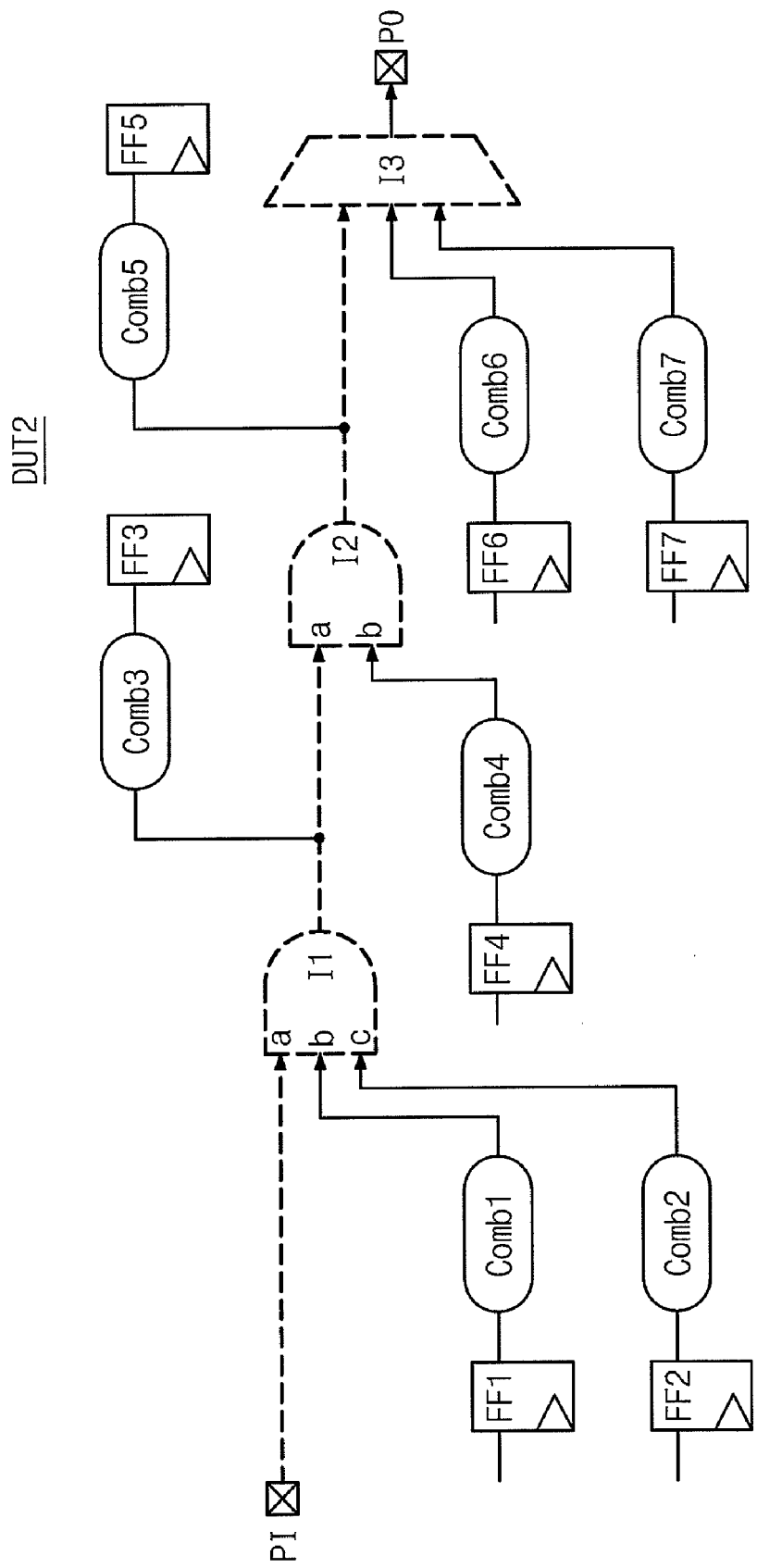
FIG. 7 is a circuit diagram of a second device including a circuit with a feed-through path.

FIG. 7 is a circuit diagram of a second device DUT2 including a circuit with a feed-through path. Referring to FIG. 7, the second device DUT2 is comprised of first through seventh combination circuits Comb1~Comb7, first through seventh flipflops FF1~FF7, first and second AND gates I1 and I2, and a multiplexer I3.

The primary input PI of the second device DUT2 is connected to the primary output PO through the first and second AND gates I1 and I2, and the multiplexer I3. A feed-through path passes from the primary input PI to the primary output PO via an input node a of the AND gate I1, an output node of the AND gate I1, an input node a of the AND gate I2, an output node of the AND gate I2, and the multiplexer I3. The feed-through path is illustrated by thick broken lines in FIGS. 7 and 8.

Figure 8:
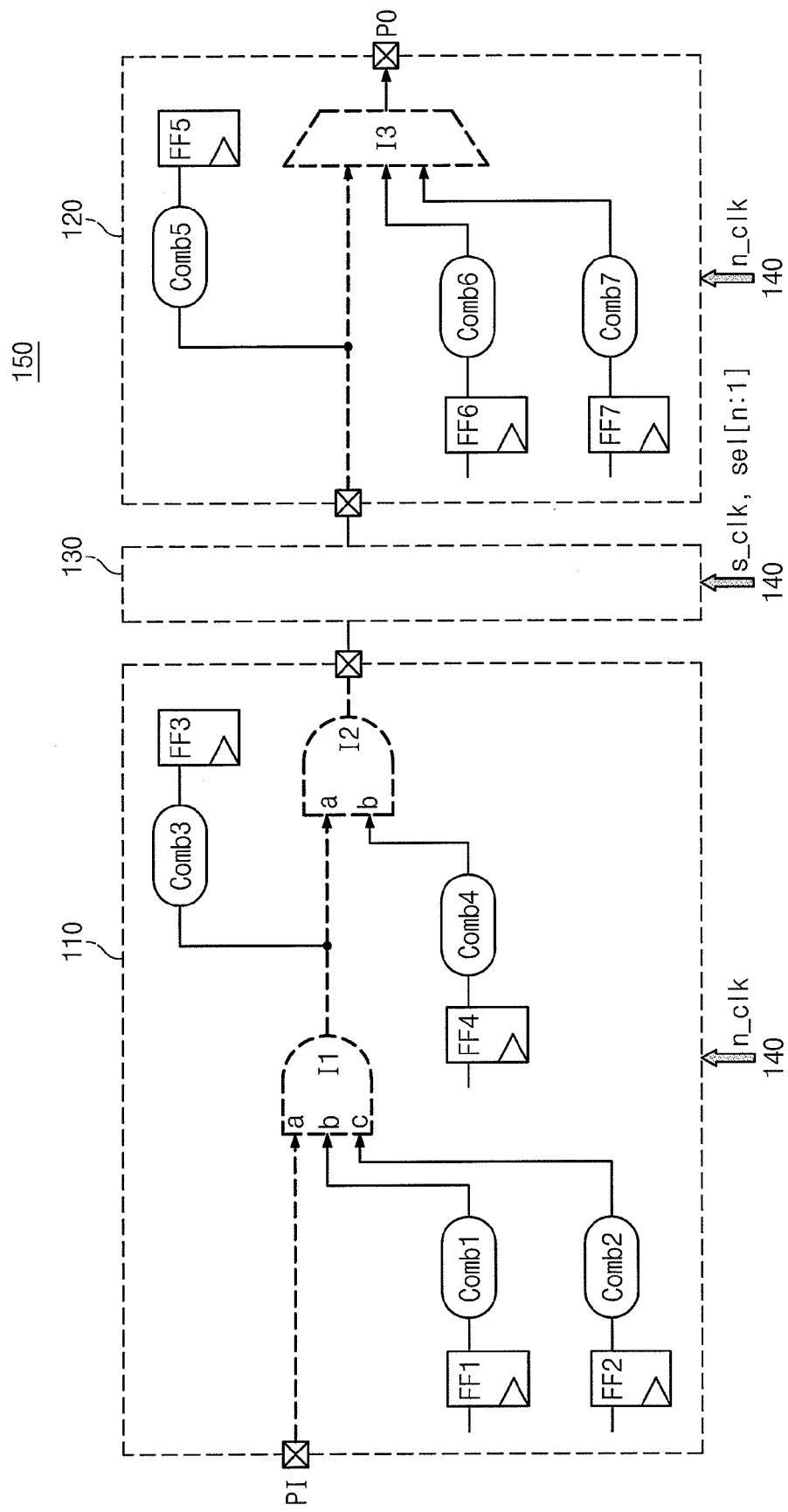
FIG. 8 is a block diagram showing first and second emulators emulating the second device of FIG. 7, according to an exemplary embodiment of the present invention.

FIG. 8 is a block diagram showing first and second emulators 110 and 120 emulating the second device DUT2 of FIG. 7, according to an exemplary embodiment of the present invention. Referring to FIGS. 7 and 8, the second device DUT2 is emulated by first and second hardware emulators 110 and 120. The first hardware emulator 110 includes the first through fourth combination circuits Comb1~Comb4, the first through fourth flipflops FF1~FF4, and the first and second AND gates I1 and I2. The second hardware emulator 120 includes the fifth through seventh combination circuits Comb5~Comb7, the fifth through seventh flipflops FF5~FF7, and the multiplexer I3. The time division connector 130 interconnects the first hardware emulator 110 to the second hardware emulator 120.

The first and second hardware emulators 110 and 120 operate in sync with the normal clock n_clk provided from a controller 140 (not shown), and the time division connector 130 operates in sync with the shift clock s_clk provided from the controller 140. The first and second hardware emulators 110 and 120 include feed-through paths denoted by thick broken lines.

Figure 9:
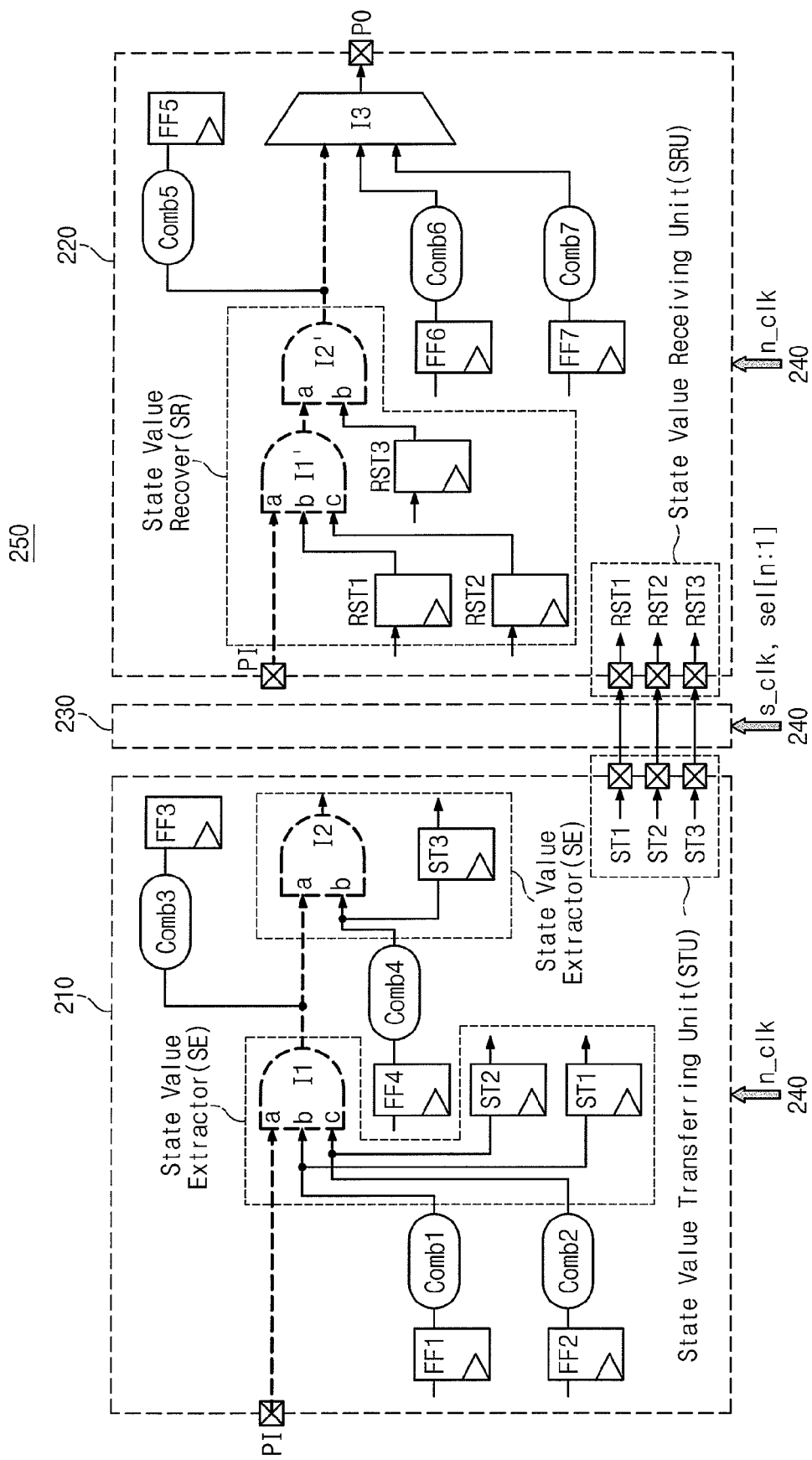
FIG. 9 is a block diagram that illustrates modifications that may be made to the emulators of FIG. 8 to remove a feed-through path, according to an exemplary embodiment of the present invention.

FIG. 9 is a block diagram illustrating an alternate embodiment of the first and second hardware emulators shown in FIG. 8, where the feed-through paths are removed. Referring to FIG. 9, the first hardware emulator 210 includes the first through fourth combination circuits Comb1~Comb4, the first through fourth flipflops FF1~FF4, the first and second AND gates I1 and I2, and the first through third state flipflops ST1~ST3. The second hardware emulator 220 includes the fifth through seventh combination circuits Comb5~Comb7, the fifth through seventh flipflops FF5~FF7, the multiplexer I3, and the first through third state recovery flipflops RST1~RST3.

The first and second hardware emulators 210 and 220 operate in sync with the normal clock n_clk provided from a controller 240 (not shown), and the time division connector 230 operates in sync with the shift clock s_clk provided from the controller 240. The first state flipflop ST1 stores a previous state value of the input node b of the AND gate I1 of the first hardware emulator 210. The second state flipflop ST2 stores a previous state value of the input node c of the AND gate I1 of the first hardware emulator 210. The third state flipflop ST3 stores a previous state value of the input node b of the AND gate I2 of the first hardware emulator 210.

The first hardware emulator 210 is further comprised of the plurality of state flipflops ST1~ST3 for storing state values of all inputs of the plurality of combination circuits (e.g., the AND gates I1 and I2) forming the feed-through path. The plurality of state flipflops ST1~ST3 store state values of the input nodes of the AND gates I1 and I2 according to the previous normal clock n_clk. Thus, the state values stored in the state flipflops ST1~ST3 are transferred to the state recovery flipflops RST1~RST3 while resultant data of the first and second hardware emulators 210 and 220 is sent after completing the previous normal clock n_clk.

The first state recovery flipflop RST1 receives a previous state value of an input node b of an AND gate I1 of the first hardware emulator 210 from the first state flipflop ST1 and restores the previous state value. The second state recovery flipflop RST2 receives a previous state value of an input node c of an AND gate I1 of the first hardware emulator 210 from the second state flipflop ST2 and restores the previous state value. The third state recovery flipflop RST3 receives a previous state value of an input node b of an AND gate I2 of the first hardware emulator 210 from the third state flipflop ST3 and restores the previous state value.

The second hardware emulator 220 is comprised of a primary input PI, an AND gate I1', first and second state recovery flipflops RST1 and RST2 for restoring state values of input nodes b and c of the AND gate I1', an AND gate I2', and a third state recovery flipflop RST3 for restoring a state value of an input node b of the AND gate I2', which form the feed-through path of the second hardware emulator 220.

Before activation of the current normal clock n_clk, a state value of the first state recovery flipflop RST1 is provided to the input node b of the AND gate I1' and a state value of the second state recovery flipflop RST2 is provided to the input node c of the AND gate I1'. Before activation of the current normal clock n_clk, a state value of the third state recovery flipflop RST3 is provided to the input node b of the AND gate I2'.

An input node a of the AND gate I1' may be directly connected to the primary input PI_0 and an input node a of the AND gate I2' may be directly connected to an output node of the AND gate I1'.

The plurality of state flipflops ST1~ST3 store state values of the input nodes of the AND gates I1 and I2 according to the previous normal clock n_clk. Thus, the state values stored in the first through third state flipflops ST1~ST3 are transferred to the first through third state recovery flipflops RST1~RST3 while resultant data of the first and second hardware emulators 210 and 220 is sent to an external computer 260 after completing the previous normal clock n_clk.

For example, the first hardware emulator 210 transfers an abstracted state value through a state value abstractor and the second hardware emulator 220 restores the abstracted state value through a state value restorer.

Consequently, embodiments of the hardware emulation system 200 may operate in a same transmission speed as verification data whether or not a feed-through path is present.

Figure 10:
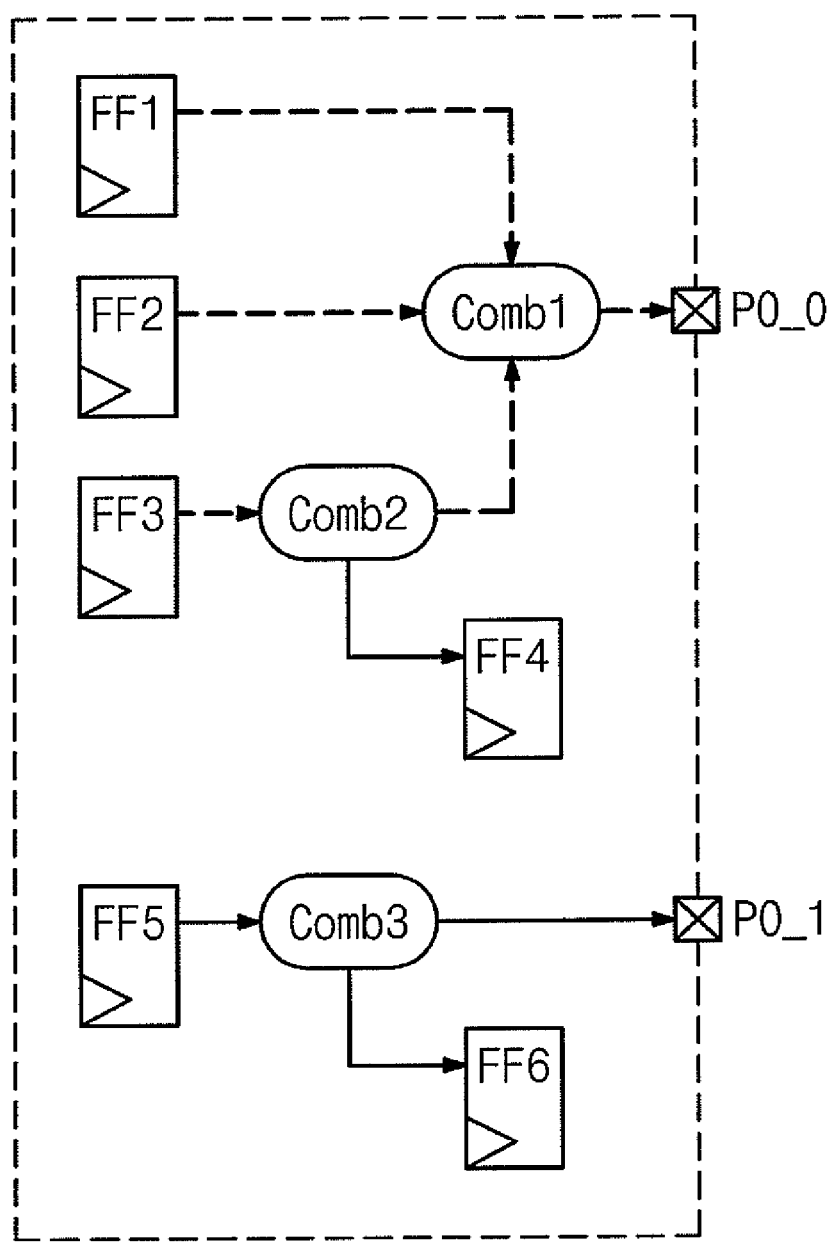
FIG. 10 is a block diagram of a third device.

FIG. 10 is a block diagram of a third device DUT3. Referring to FIG. 10, the third device DUT3 is comprised of first through fifth flipflops FF1~FF5, first through third combination circuits Comb1~Comb3, and first and second primary outputs PO_0 and PO_1.

The first primary output PO_0 is connected to an output of the first combination circuit Comb1, which is coupled to outputs of the first and second flipflops FF1 and FF2 and the second combination circuit Comb2. The second primary output PO_1 is connected to an output of the third combination circuit Comb3.

Figure 11:
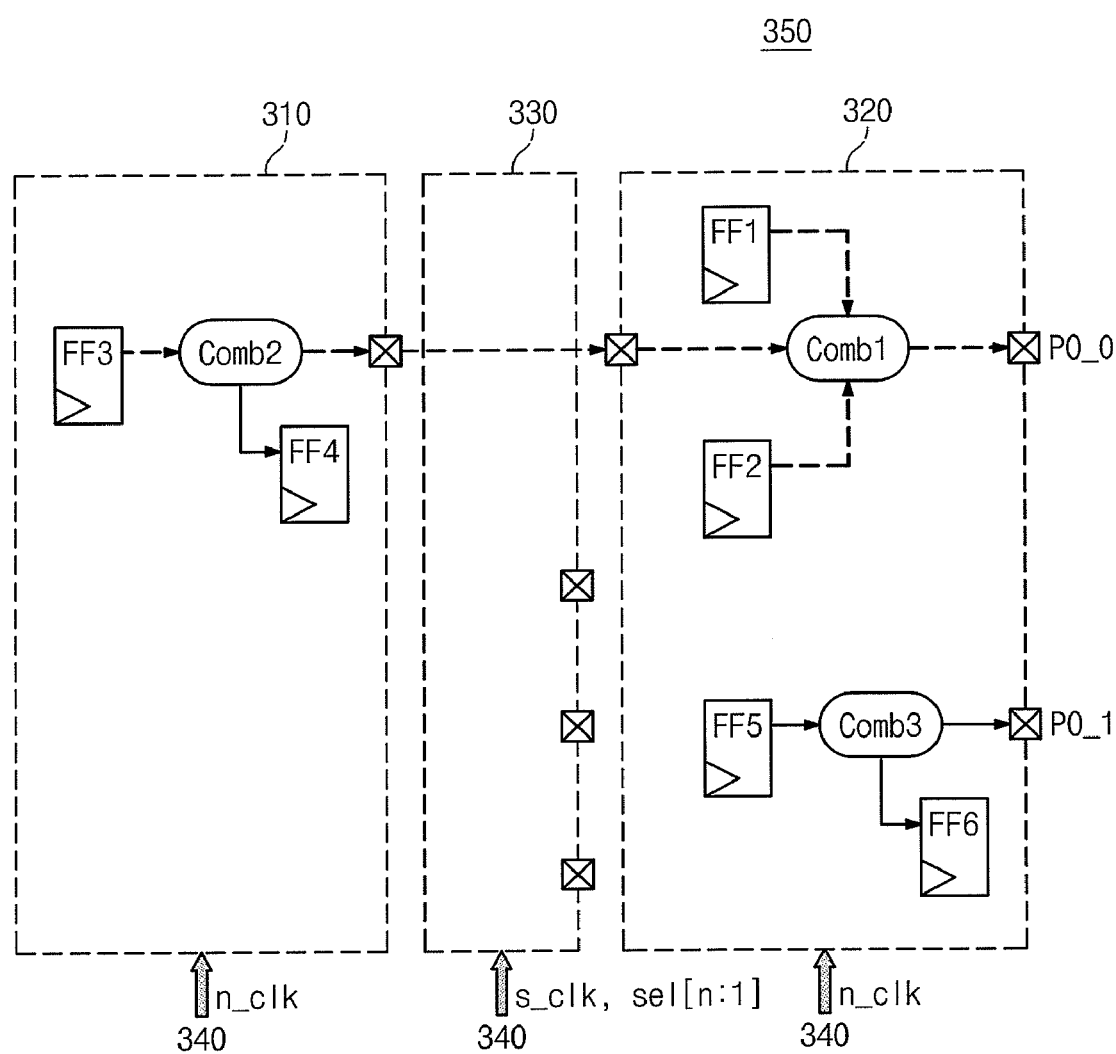
FIG. 11 is a block diagram showing first and second hardware emulators emulating the third device of FIG. 10, according to an exemplary embodiment of the present invention.

FIG. 11 is a block diagram showing first and second hardware emulators 310 and 320 emulating the third device DUT3 of FIG. 10, according to an exemplary embodiment of the present invention. Referring to FIGS. 10 and 11, the third device DUT3 is divided into first and second logic parts for respective emulation by the first and second hardware emulators 310 and 320. The third device DUT3 does not have an FDT path initially, but the FDT path is included therein after it is has been divided among the first and second hardware emulators 310 and 320. For example, the FDT path passes from the third flipflop FF3 to the first combination circuit Comb1 via the second combination circuit Comb2. The FDT path is illustrated by the broken line in FIG. 11.

When an FDT path is present, an output of the second combination circuit Comb2 is transferred after the shifting operation, but not during the normal clock operation.

Skipping a shifting operation time when the FDT path is present in the first and second hardware emulators 310 and 320 will be discussed in conjunction with FIGS. 12 through 14.

Figure 12:
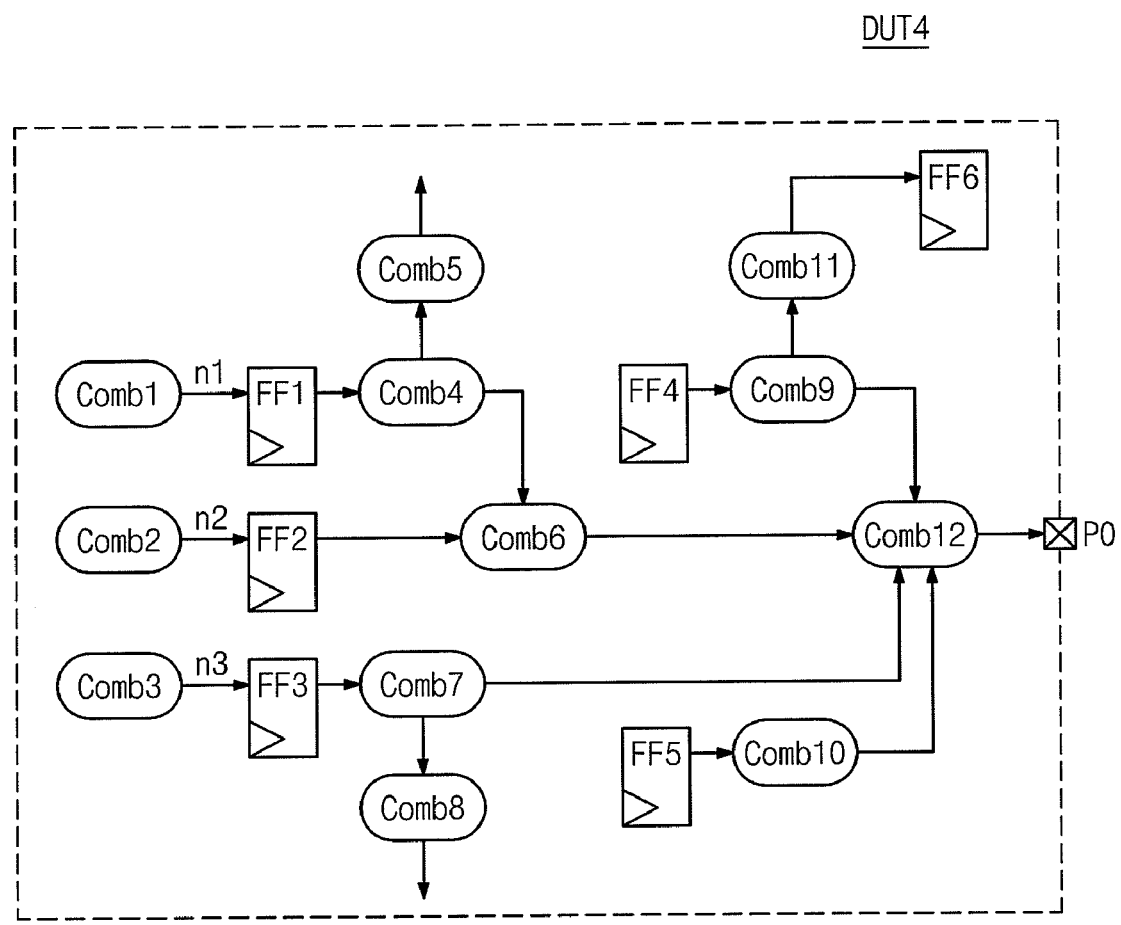
FIG. 12 is a block diagram of a fourth device.

FIG. 12 is a block diagram of a fourth device DUT4. Referring to FIG. 12, the fourth device DUT4 is comprised of first through twelfth combination circuits Comb1~Comb12, and first through sixth flipflops FF1~FF6.

A primary output PO of the fourth device DUT4 is generated from the twelfth combination circuit Comb12. The twelfth combination circuit Comb12 receives outputs of the sixth, seventh, ninth, and tenth combination circuits Comb6, Comb7, Comb9, and Comb10.

Figure 13:
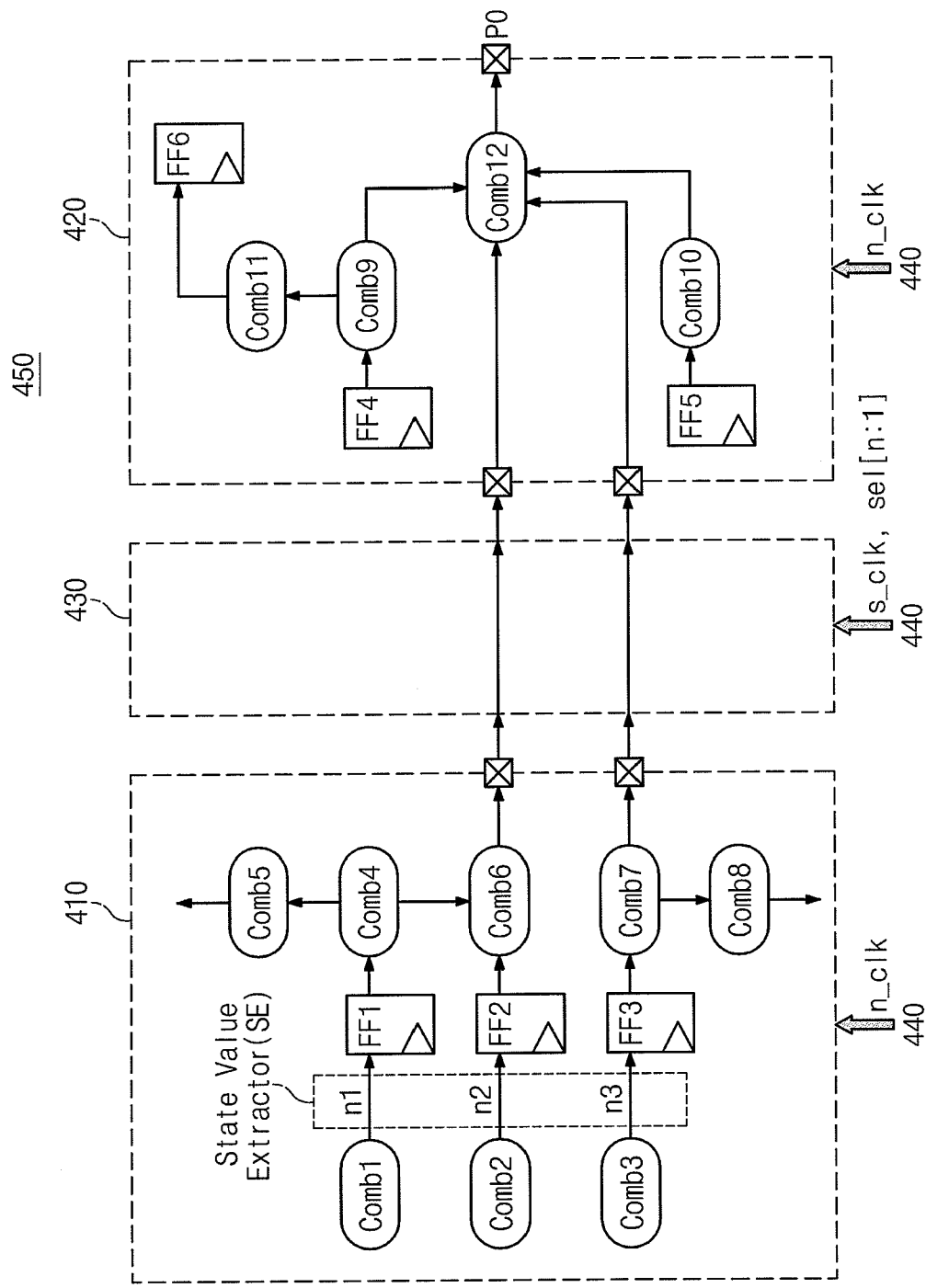
FIG. 13 is a block diagram showing first and second hardware emulators emulating the fourth device of FIG. 12, according to an exemplary embodiment of the present invention.

FIG. 13 is a block diagram showing first and second hardware emulators 410 and 420 emulating the fourth device DUT4 of FIG. 12, according to an exemplary embodiment of the present invention. Referring to FIGS. 12 and 13, the fourth device DUT4 is divided into first and second logical parts for respective emulation by the first and second hardware emulators 410 and 420. The first hardware emulator 410 includes the first through eighth combination circuits Comb1~Comb8 and the first through third flipflops FF1~FF3. The second hardware emulator 420 includes the ninth through twelfth combination circuits Comb9~Comb12 and the fourth through sixth flipflops FF4~FF6. The time division connector 430 interconnects the first hardware emulator 410 to the second hardware emulator 420.

The first and second hardware emulators 410 and 420 operate in sync with the normal clock n_clk provided from a controller 440 (not shown). The time division connector 430 operates in sync with the shift clock s_clk provided from the controller 440. The first and second hardware emulators 410 and 420 include an FDT path denoted by a thick solid line.

Figure 14:
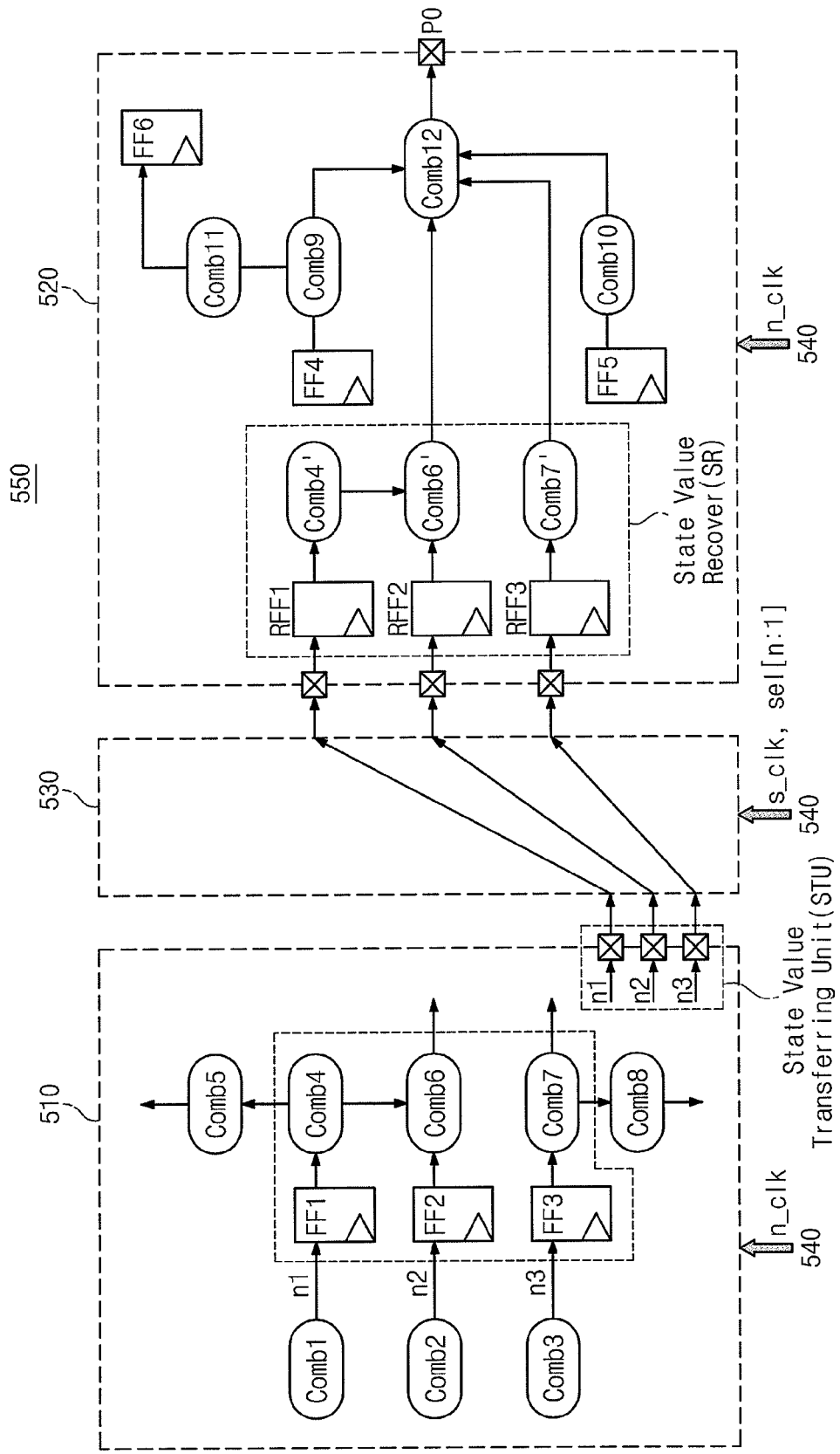
FIG. 14 is a block diagram illustrating modifications that may be made to the emulators of FIG. 13 to remove a feed-through path, according to an exemplary embodiment of the present invention.

FIG. 14 is a block diagram illustrating the first and second hardware emulators shown in FIG. 13, where the FDT path has been removed. Referring to FIG. 14, the first hardware emulator 510 includes the first through eighth combination circuits Comb1~Comb8 and the first through third flipflops FF1~FF3.

The second hardware emulator 520 includes the first through twelfth combination circuits Comb9~Comb12, the fourth and fifth flipflops FF4 and FF5, and first through third state recovery flipflops RFF1~RFF3. A time division connector 530 interconnects the first hardware emulator 510 to the second hardware emulator 530. The first and second hardware emulators 510 and 520 operate in sync with the normal clock n_clk provided from a controller 540 (not shown). The time division connector 530 operates in sync with the shift clock s_clk provided from the controller 540.

The second hardware emulator 520 is further comprised of the plurality of state recovery flipflops RFF1~RFF3 for storing state values of all inputs (i.e., state values of the fourth, sixth, and seventh combination circuits Comb4, Comb6, and Comb7) to the combination circuit (i.e., the twelfth combination circuit Comb12).

State values of the first through third combination circuits Comb1~Comb3 are stored in the first through third flipflops FF1~FF3. The state values stored in the first through third flipflops FF1~FF3 according to the previous normal clock n_clk are transferred to the first through third state recovery flipflops RFF1~RFF3 while resultant data of the first and second hardware emulators 510 and 520 is sent to an external computer 560 (not shown).

The first state recovery flipflop RFF1 stores a state value of the first combination circuit Comb1 of the first hardware emulator 510 through the time division connector 530. The second state recovery flipflop RFF2 stores a state value of the second combination circuit Comb2 of the first hardware emulator 510 through the time division connector 530. The third state recovery flipflop RFF3 stores a state value of the third combination circuit Comb3 of the first hardware emulator 510 through the time division connector 530.

The second hardware emulator 520 further includes a fourth combination circuit Comb4', and sixth and seventh combination circuits Comb6' and Comb7', in addition to the first through third state recovery flipflops RFF1~RFF3.

Therefore, embodiments of the hardware emulation system may operate in the same transmission speed as verification data whether or not a FDT path is present.

Figure 15:
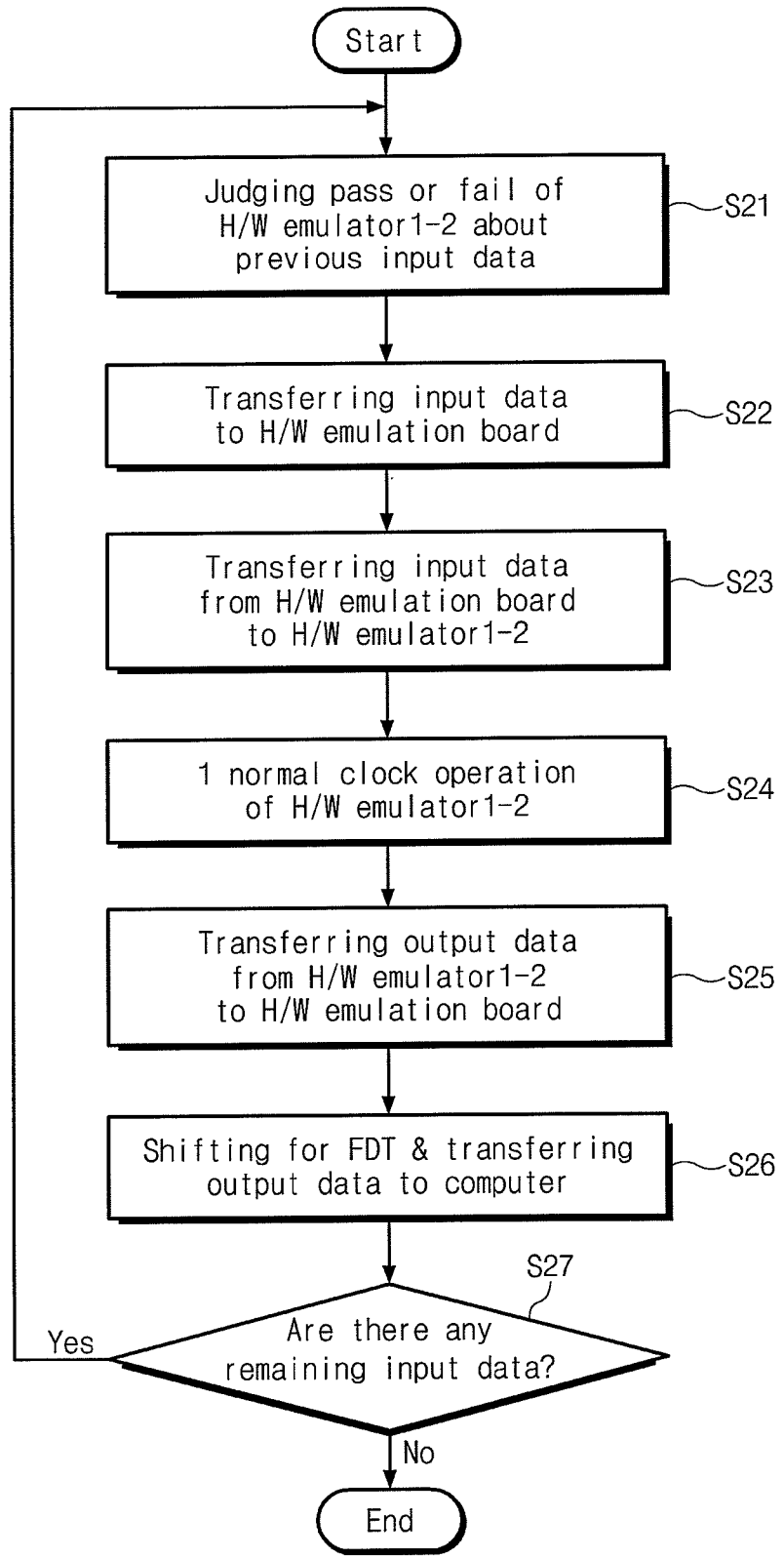
FIG. 15 is a flow chart showing a method of driving an emulation system according to an exemplary embodiment of the present invention.

FIG. 15 is a flow chart showing a method of driving the emulation system of FIG. 1, according to an exemplary embodiment of the present invention. Referring to FIGS. 1 and 15, the computer 60 prepares new input data for verifying the first and second hardware emulators 10 and 20. The computer 60 determines pass/fail states of the first and second hardware emulators 10 and 20 by comparing an expected output of the emulators to actual output of the emulators. For example, the computer compares output data of the emulators to previous input data for verifying the first and second hardware emulators 10 and 20 (S21).

Thereafter, the computer 60 transfers new input data to the hardware emulation board 50 for verifying the first and second hardware emulators 10 and 20 (S22). Then, the first and second hardware emulators 10 and 20 receive the new input data from the hardware emulation board 50 (S23).

As aforementioned by FIGS. 6 through 9, the first and second hardware emulators 10 and 20 may skip the shifting operation for BDT. The first and second hardware emulators 10 and 20 conduct the normal operation in one clock cycle in sync with the normal clock n_clk (S24).

Next, the first and second emulators 10 and 20 transfers output data to the hardware emulation board 50 (S25). Then, the first and second hardware emulators 10 and 20 execute the shifting operation for FDT in sync with the shift clock s_clk and at the same time the hardware emulation board 50 transfers the output data to the computer 60 (S26).

The computer 60 determines whether other input data to be used for verifying the first and second hardware emulators 10 and 20 is present. If new input data is present, the step S21 is resumed. Unless there is new input data, the emulation procedure for the hardware emulation system 100 is terminated (S27).

Figure 16:
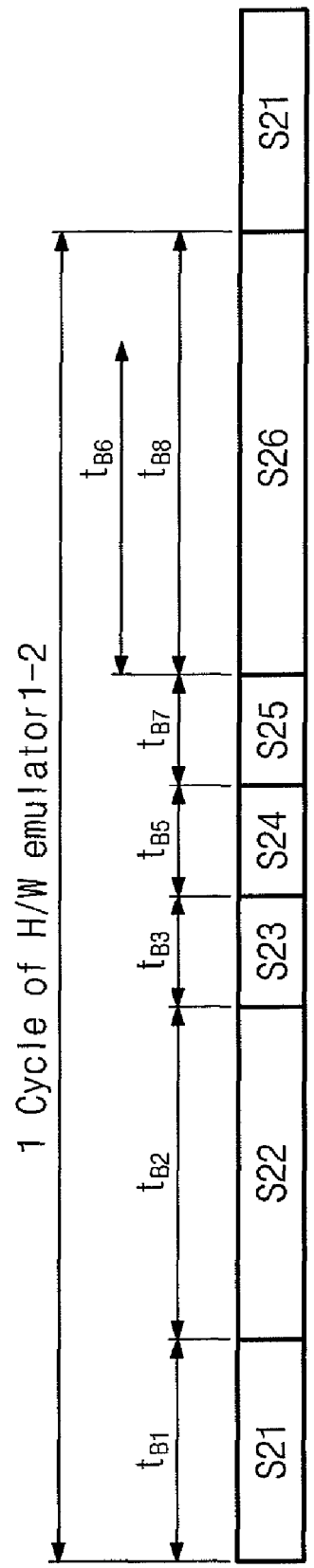
FIG. 16 illustrates durations of steps of the emulation method shown in FIG. 15.

FIG. 16 illustrates durations of steps of the emulation method shown in FIG. 15. Referring to FIGS. 15 and 16, the operating steps from S21 to S26 are correspondent to one clock cycle of the first and second hardware emulators 10 and 20.

The step S21 corresponds to a time $t_{B1}$. The step S22 corresponds to a time $t_{B2}$. The step S23 corresponds to a time $t_{B3}$. The step S24 corresponds to a time $t_{B5}$. The step S25 corresponds to a time $t_{B7}$. The step S26 corresponds to a time $t_{B8}$. As a result, one clock cycle of the first and second hardware emulators 10 and 20 is a sum of times $t_{B1}$, $t_{B2}$, $t_{B3}$, $t_{B5}$, $t_{B7}$, and $t_{B8}$.

Comparing FIG. 3 with FIG. 16, $t_{41}$ corresponds to $t_{B1}$, $t_{42}$ corresponds to $t_{B2}$, and $t_{42}$ corresponds to $t_{B3}$. The time $t_{44}$ has no correspondent because the shifting operation for BDT is skipped. Therefore, $t_{B4}$ is zero, $t_{45}$ corresponds to $t_{B5}$, $t_{46}$ corresponds to $t_{B6}$, $t_{47}$ corresponds to $t_{B7}$, and $t_{48}$ corresponds to $t_{B8}$.

The shifting operation for FDT according to at least one embodiment of the present invention is carried out in the step S26, where the hardware emulation board 50 conducts the shifting operation for FDT when transferring output data to the computer 60.

Embodiments of the present invention may be effective in reducing an emulation time by shortening a data transmission time between an emulation system and an external computer.

Although exemplary embodiments of the present invention have been described, it is to be understood that the present invention is not limited to these exemplary embodiments, and various changes and modifications can be made by one ordinary skilled in the art within the spirit and scope of the disclosure.

What is claimed is:

1. An emulation system comprising:
a first circuit for emulating a first logical part of a device;
a second circuit for emulating a second logical part of the device that is different from the first logical part, wherein the first circuit is separate from the second circuit;
a third circuit connecting the first circuit and the second circuit to communicate signals between the first circuit and the second circuit; and
a controller generating a normal clock signal for output to the first and second circuits and a shift clock signal for output to the third circuit, wherein the shift clock signal is the normal clock signal shifted in phase,
wherein the first and second circuits operate in sync with the normal clock signal and the third circuit operates in sync with the shift clock signal.

2. The emulation system of claim 1, wherein the third circuit is a time division connector.

3. The emulation system of claim 2, wherein each of the first and second circuits include a flipflop and a state value of the flipflop of the first circuit is transferred to the flipflop of the second circuit though the time division connector while resultant data of the first through third circuits is sent to an external source.

4. The emulation system of claim 1, where the controller outputs a selection signal to the third circuit,
wherein the third circuit is a time division connector that connects the first circuit to the second circuit in a time division manner and operates in sync with the shift clock signal.

5. The emulation system of claim 4, wherein the time division connector enables a connection between output pins of the first circuit and second circuit to input pins of the first and second circuit in response to the selection signal.

6. The emulation system of claim 1, wherein the first and second circuits include field programmable gate arrays.

7. The emulation system of claim 1, wherein the time division connector comprises:
at least two first shift flipflops for receiving respective outputs of the first circuit; and
at least two second shift flipflops for receiving respective inputs of the second circuit.

8. The emulation system of claim 7, wherein the time division connector further comprises:
a first multiplexer to receive outputs of the at least two first shift flipflops; and
a second multiplexer to receive outputs of the at least two second shift flipflops.

9. The emulation system of claim 8, wherein the time division connector further comprises:
a first demultiplexer demultiplexing an output of the first multiplexer;
a second demultiplexer demultiplexing an output of the second multiplexer;
at least two third shift flipflops delivering outputs of the first demultiplexer to the second circuit; and
at least two fourth shift flipflops delivering outputs of the second demultiplexer to the first circuit.

10. The emulation system of claim 1, wherein the emulation system is configured to verify an intellectual property of the device.

11. An emulation system comprising:
a first circuit to emulate a first logical part of a device;
a second circuit to emulate a second logical part of the device, wherein the first circuit is separate from the second circuit; and
a time division connector connecting the first and second circuits to each other in a time division manner,
wherein the time division connector transfers an output of the first circuit to the second circuit before activation of a normal clock signal input to the first circuit, the first and second circuits operate in sync with the normal clock signal, and the time division connector inputs a state value of the first circuit to the second circuit in sync with a shift clock signal input to the time division connector,
wherein the shift clock signal is the normal clock signal shifted in phase.

12. The emulation system of claim 11, wherein each of the first and second circuits comprises at least a flipflop and combination circuit.

13. The emulation system of claim 12, wherein the state value of the first circuit is a state value of the flipflop.

14. The emulation system of claim 11, further comprising:
a controller generating the normal clock signal, the shift clock signal, and a selection signal.

15. The emulation system of claim 12, wherein the state value of the flipflop of the first circuit is transferred to the flipflop of the second circuit though the time division connector while resultant data of the first and second circuits is sent to an external source.

16. The emulation system of claim 14, wherein the time division connector enables a connection from output pins of the first circuit to input pins of the second circuit in response to the selection signal.

17. The emulation system of claim 11, wherein the first and second circuits include field programmable gate arrays.

18. A method of driving an emulation system with an emulation board including separate first and second emulators configured to respectively emulate first and second logical parts of a device, the method comprising:
transferring verification data to the first and second emulators;
operating the first and second emulators for a cycle of a normal clock signal output to the first and second emulators, wherein the first and second emulators operate in sync with the normal clock signal; and
transferring a state value of the first emulator to the second emulator via a connection circuit in sync with a shift clock signal output to the connection circuit before an activation of the normal clock signal while sending output data of the first and second emulators to an external source, wherein the shift clock signal is the normal clock signal shifted in phase.

19. The method of claim 18, wherein each of the first and second emulators comprises at least a flipflop and a combination circuit.

20. The method of claim 19, wherein the state value of the first emulator is a state value of the flipflop of the first emulator.

* * * * *